United States Patent
Zhai et al.

(10) Patent No.: US 10,969,836 B2
(45) Date of Patent: Apr. 6, 2021

(54) STORAGE SYSTEM

(71) Applicant: EMC IP Holding Company LLC, Hopkinton, MA (US)

(72) Inventors: Haifang Zhai, Shanghai (CN); David Dong, Shanghai (CN); Hendry Wu, Shanghai (CN); Yujie Zhou, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 166 days.

(21) Appl. No.: 16/171,977

(22) Filed: Oct. 26, 2018

(65) Prior Publication Data
US 2019/0265762 A1 Aug. 29, 2019

(30) Foreign Application Priority Data
Oct. 27, 2017 (CN) .......................... 201711023145.3

(51) Int. Cl.
G06F 1/18 (2006.01)
G06F 1/20 (2006.01)

(52) U.S. Cl.
CPC ................ G06F 1/20 (2013.01); G06F 1/182 (2013.01); G06F 1/187 (2013.01)

(58) Field of Classification Search
CPC . G06F 1/182; G06F 1/187; G06F 1/20; G11B 33/142; G11B 33/0438; H05K 7/1488
(Continued)

(56) References Cited

U.S. PATENT DOCUMENTS 5,663,862 A * 9/1997 Hopping-Mills ........ H01H 9/22
200/43.15
6,637,719 B2 * 10/2003 Jiang ...................... G06F 1/184
248/682

(Continued)

FOREIGN PATENT DOCUMENTS

CN 101339449 A 1/2009
CN 102129273 A 7/2011

Primary Examiner — Kenneth J Hansen
Assistant Examiner — Phillip Decker
(74) Attorney, Agent, or Firm — Ryan, Mason & Lewis, LLP

(57) ABSTRACT

Various embodiments of the present disclosure disclose a storage system. The storage system comprises: at least one storage device array enclosure, each of the storage device array enclosure accommodating storage devices, which are arranged in columns and have gaps existing between adjacent storage devices; each storage device array enclosure includes a cap for covering accommodated storage devices; the cap includes vents and windshield bars, such that when the cap is in a closed state, the vents abut against an upper surface of the corresponding storage devices and the windshield bars cover the gaps between adjacent storage devices. The design of the cap in the storage system of the present disclosure can ensure that during the maintenance of the storage devices in the storage device array enclosure, the cooling airflow is capable of passing through the vents of the opened cap and then entering inside of another storage device array enclosure above the maintained storage device array enclosure, so as to effectively improve thermal performance inside the storage device array enclosure.

20 Claims, 7 Drawing Sheets

(58) Field of Classification Search
USPC .................................................. 312/223.2
See application file for complete search history.

(56) References Cited

U.S. PATENT DOCUMENTS

| | | | | |
|---|---|---|---|---|
| 7,193,845 | B2* | 3/2007 | Titus | G06F 1/184 |
| | | | | 361/679.33 |
| 7,385,812 | B1 | 6/2008 | Konshak et al. | |
| 7,394,660 | B2* | 7/2008 | Hidaka | G11B 33/126 |
| | | | | 361/724 |
| 7,495,906 | B2* | 2/2009 | Fujie | G11B 33/12 |
| | | | | 361/679.33 |
| 7,826,212 | B2* | 11/2010 | Shogan | G06F 1/20 |
| | | | | 361/679.46 |
| 9,007,766 | B2* | 4/2015 | Harvilchuck | G06F 1/181 |
| | | | | 174/547 |
| 9,706,687 | B1* | 7/2017 | Frangioso, Jr. | H05K 7/20736 |
| 10,271,460 | B2* | 4/2019 | Huang | H05K 7/1489 |
| 10,412,851 | B2* | 9/2019 | Chen | H05K 7/20727 |
| 10,416,732 | B1* | 9/2019 | Yu | G11B 33/027 |
| 2004/0013502 | A1 | 1/2004 | Chiou | |
| 2006/0232923 | A1* | 10/2006 | Liang | G06F 1/187 |
| | | | | 361/679.37 |
| 2019/0054608 | A1* | 2/2019 | Divicino | B25H 3/003 |
| 2019/0208657 | A1* | 7/2019 | Chen | G11B 33/00 |

* cited by examiner

STORAGE SYSTEM

RELATED APPLICATIONS

This application claims priority from Chinese Patent Application Number CN 201711023145.3, filed on Oct. 27, 2017 at the State Intellectual Property Office, China, titled "STORAGE SYSTEM" the contents of which are incorporated by reference herein in their entirety.

FIELD

Various embodiments of the present disclosure relate to the field of storage systems, and more specifically, to a storage system having a disk array enclosure with improved thermal performance.

BACKGROUND

An existing storage system, such as a disk array cabinet, has advantages including fast data storage speed, large storage capacity and so on. Therefore, the storage system is widely applied within enterprises, so as to perform storage of massive data. The disk array cabinet includes a plurality of disks with small capacity, high stability and low speed. These disks are combined into a large-scale disk array storage system, which improves the efficiency of the entire disk storage system by adding the effects caused by providing data from individual disks. Such a technique is employed during data storage to segment data into a plurality of sections and respectively store them on various disks. The principle of the disk array cabinet is to operate the disk groups in an array manner, cooperating with the design of data dispersive arrangement and enhancing the data security. An external disk array cabinet is often used on a large-scale server and has Hot Swap characteristics. Thermal issues are a challenge faced by the disk array and other storage systems.

SUMMARY

According to one aspect of the present disclosure, there is provided a storage system. The storage system comprises: at least one storage device array enclosure, each of the storage device array enclosure accommodating storage devices, which are arranged in columns and have gaps existing between adjacent storage devices; each storage device array enclosure includes a cap for covering accommodated storage devices; the cap includes vents and a windshield bars, such that when the cap is closed, the vents abut against an upper surface of corresponding storage devices and the windshield bars cover the gaps between adjacent storage devices.

According to some embodiments of the present disclosure, the windshield bars and the vents are arranged in parallel with each other.

According to some embodiments of the present disclosure, the windshield bars and the vents can be staggered, thereby forming a grid structure.

According to some embodiments of the present disclosure, a width of a single windshield bar is greater than a width of a single gap an opening area of a single vent is smaller than an area of an upper surface of a single storage device, and a number of the vents in each cap is identical to a number of storage devices in each column of the storage devices.

According to some embodiments of the present disclosure, the storage device array enclosure includes an inner casing and an outer casing disposed in a drawer manner. The storage devices are accommodated in the inner casing and the cap is rotatably mounted on the inner casing.

According to some embodiments of the present disclosure, the at least one storage device array enclosure at least includes a first storage device array enclosure and a second storage device array enclosure placed adjacent to each other along a thickness direction of the enclosure, wherein when one cap in the first storage device array enclosure is in an open state, the airflow is capable of passing through the vents of said one cap in the first storage device array enclosure and then entering the second storage device array enclosure.

BRIEF DESCRIPTION OF THE DRAWINGS

In the drawings, similar/same reference signs throughout different views generally represent similar/same parts. Drawings are not necessarily on scale. Rather, emphasis is placed upon the illustration of the principles of the present invention. In the drawings.

DETAILED DESCRIPTION OF EMBODIMENTS

Figure 1:
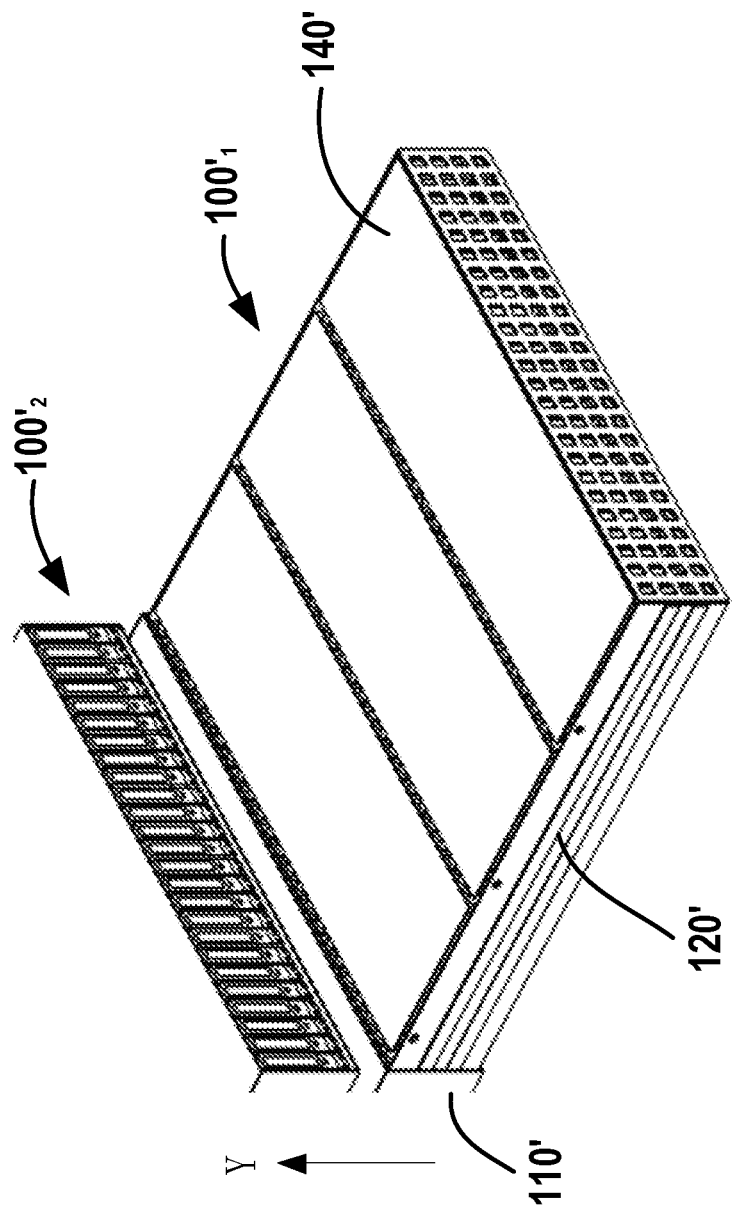
FIG. 1 illustrates a schematic structure diagram of a disk array enclosure of the prior art.

Principles of the present disclosure are now explained with reference to various example embodiments shown in the drawings. It should be appreciated that description of those embodiments is merely to enable those skilled in the art to better understand and further implement the present disclosure and is not intended for limiting the scope disclosed herein in any manner. It should be noted that similar or same reference signs can be used in the drawings where feasible, and similar or same reference signs can represent similar or same functions. Those skilled in the art will easily recognize from the following description that alternative embodiments of the structure and method described in the text can be adopted without deviating from the principles of the present invention described herein.

The storage system of the prior art, such as a disk array cabinet, generally includes high-density storage devices, e.g., disk devices. Therefore, thermal issue is crucial for such a storage system. The present disclosure relates to improving thermal performance of the storage system of the prior art. However, those skilled in the art would understand that the storage system involved in the present invention is not limited to the disk array enclosures described in the detailed embodiments and also not limited to using the disk device as the storage device. Without deviating from the principles of the present invention, other types of storage systems and/or storage devices are also applicable.

In particular, for the sake of description, the following text will take disks as examples of storage to analyze problems existing in the traditional solution and depict several example embodiments according to the present disclosure. However, it should be understood that this is merely exemplary and is not intended for limiting the scope disclosed herein in any manner. Concepts and principles described herein are suitable for any storage devices currently known or to be developed in the future.

Figure 2A:
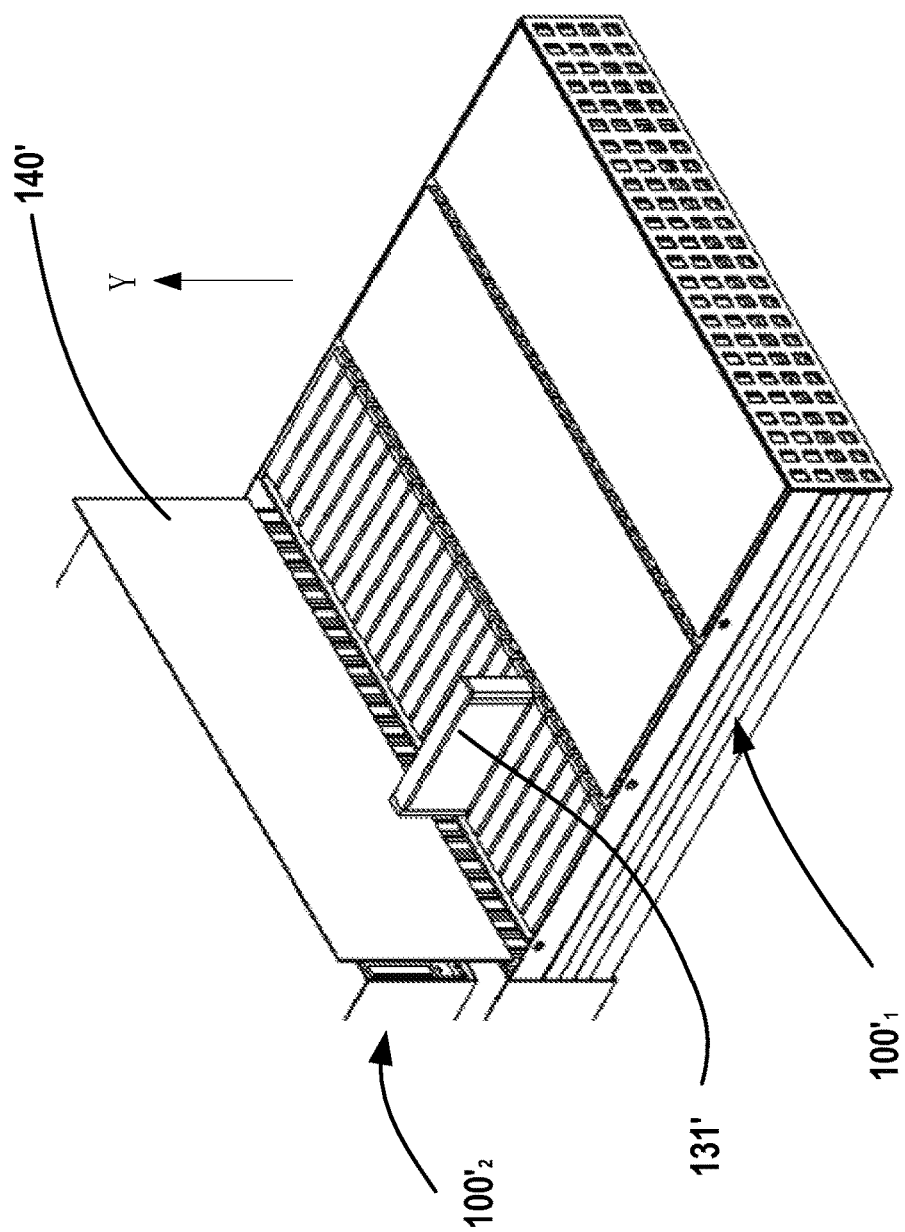
FIG. 2a illustrates a schematic structure diagram of at least one disk array enclosure of the prior art in a maintenance state.
Figure 2B:
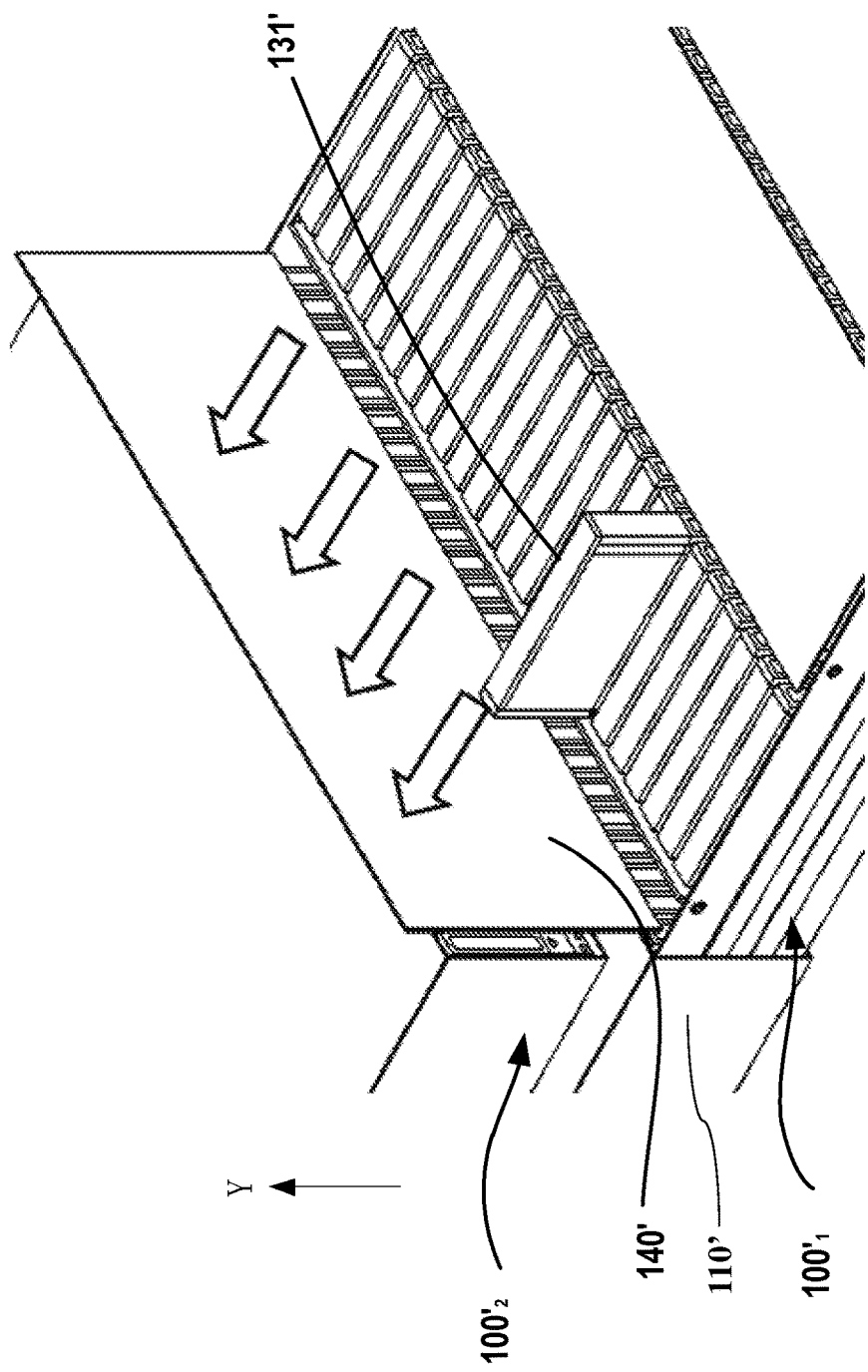
FIG. 2b illustrates a schematic diagram of the airflow within at least one disk array enclosure of the prior art in a maintenance state.

FIGS. 1, 2a and 2b illustrate schematic diagrams of a storage system including a disk array enclosure of the prior art, wherein FIG. 1 shows a schematic structure diagram of at least one disk array enclosure of the prior art; FIG. 2a shows a schematic structure diagram of at least one disk array enclosure of the prior art in a maintenance state, and FIG. 2b shows a schematic diagram of airflow within at least one disk array enclosure of the prior art in a maintenance state.

As shown in FIG. 1, the disk array enclosures $100_1'$ and $100_2'$ of the prior art usually include an inner casing 120' and an outer member or casing 110' arranged in a drawer manner, wherein the inner casing 120' accommodates a plurality of disk devices disposed in rows or columns. Particularly, each column of disk devices is provided with a cap 140' covering the accommodated disk devices. The cap 140' can be rotatably mounted on the inner casing 120' and usually is made of transparent plastic components. The cap 140' is such mounted that the cap can be conveniently opened and closed to maintain the disk array enclosures. The cap 140' on each column of disk devices plays a role of avoiding the cooling airflow, which passes through the inside of the disk array enclosure, from leaking to the outside of the cap 140'. In such an arrangement, once the cooling airflow is leaked, the temperature within the disk array enclosure 100' will dramatically increase, which might damage the disk devices within the disk array enclosure. Therefore, the cap 140' on each column of disk devices is quite crucial for each disk array enclosure.

FIG. 1 illustrates two disk array enclosures $100_1'$ and $100_2'$, wherein the first disk array enclosure $100_1'$ and the second disk array enclosure $100_2'$ are superimposed at a certain distance along a thickness direction Y, and the disk device array in the first disk array enclosure $100_1'$ is pulled out like a drawer. As shown in FIG. 1, the first disk array enclosure $100_1'$ includes three columns of disk devices and three respective caps 140' covering the three columns of disk devices. It will be understood that there might be more disk array enclosures and each disk array enclosure might include more columns of disk devices and respective caps. The disk array enclosures can be mounted, for example, in a disk array cabinet along a thickness direction for instance.

As shown in FIG. 2a, when the disk devices in the disk array cabinet are maintained, it is possibly required to open a corresponding cap 140' in the disk array enclosure to retrieve a respective disk device 131'. However, such maintenance operations might impact thermal performance of the disk devices of the storage system of the prior art.

As shown in FIG. 2b, the second disk array enclosure $100_2'$ is located above the first disk array enclosure $100_1'$. When the above maintenance operations are performed, the cap 140' in the first disk array enclosure $100_1'$ will be opened, which will block an inlet of the second disk array enclosure $100_2'$. This results in dramatic temperature rise of the disk devices in the second disk array enclosure $100_2'$, which might damage the disk devices in the second disk array enclosure $100_2'$.

Therefore, the design of the cap in the disk array enclosure of the prior art is unfavorable for normal flow of the cooling airflow, which might result in severe thermal issues in the disk array enclosure of the prior art.

To solve the above thermal issues, the present disclosure provides a novel cap suitable for disk devices, which can effectively solve or alleviate the severe thermal issues in the disk array enclosure and will not cause leakage of the cooling airflow inside the disk array enclosure when the cap is closed.

Figure 3A:
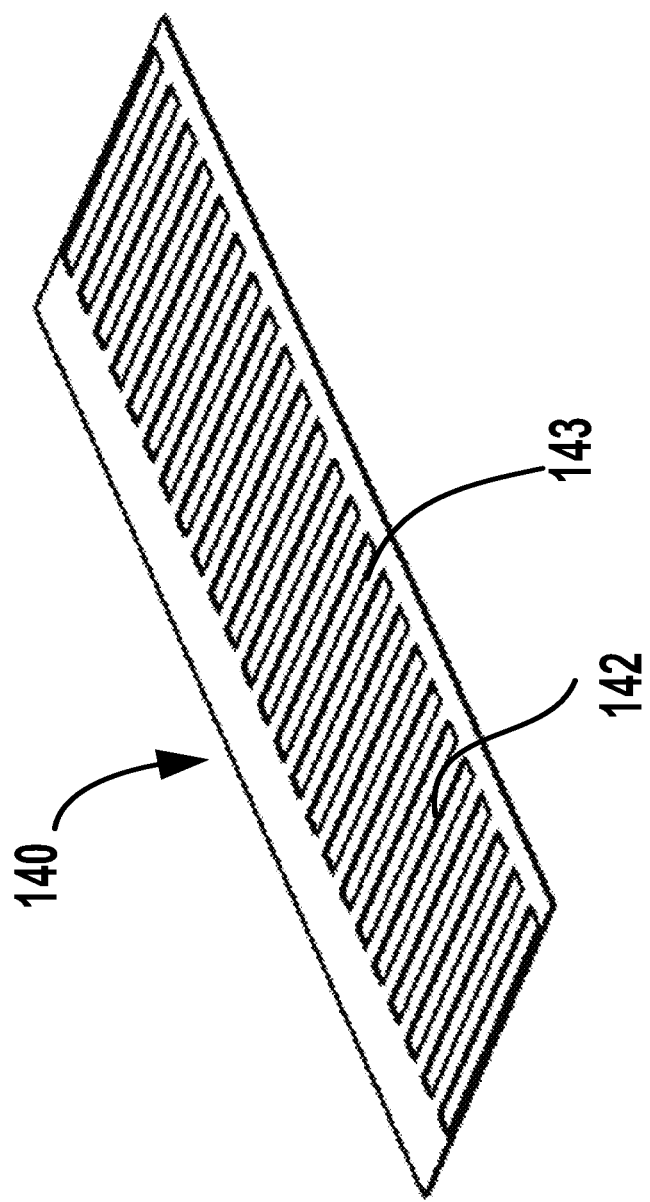
FIG. 3a illustrates a schematic structure diagram of a cap in a disk array enclosure according to one embodiment of the present invention.
Figure 3B:
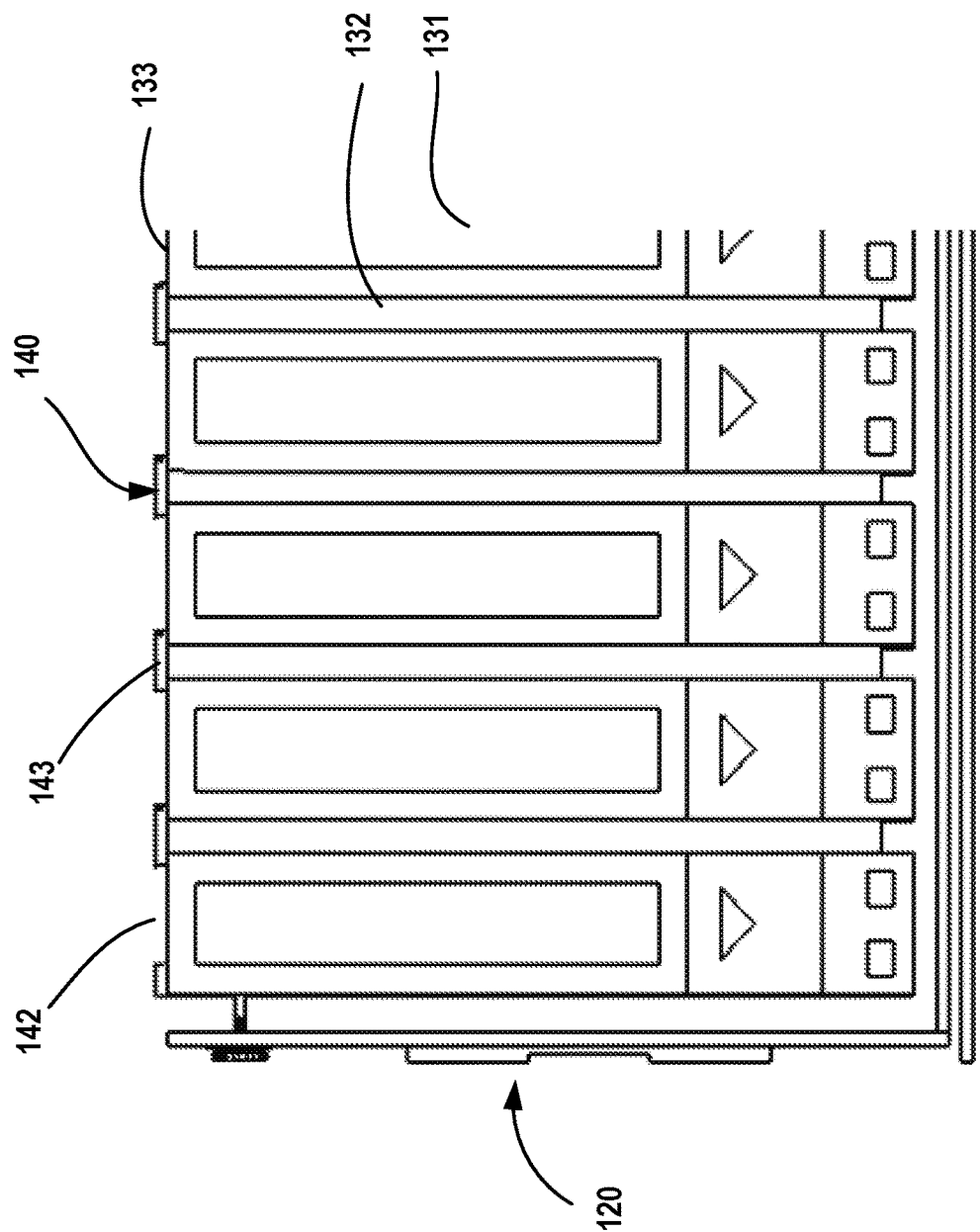
FIG. 3b illustrates a cross-section schematic diagram of a disk array enclosure having a cap according to one embodiment of the present invention.
Figure 4A:
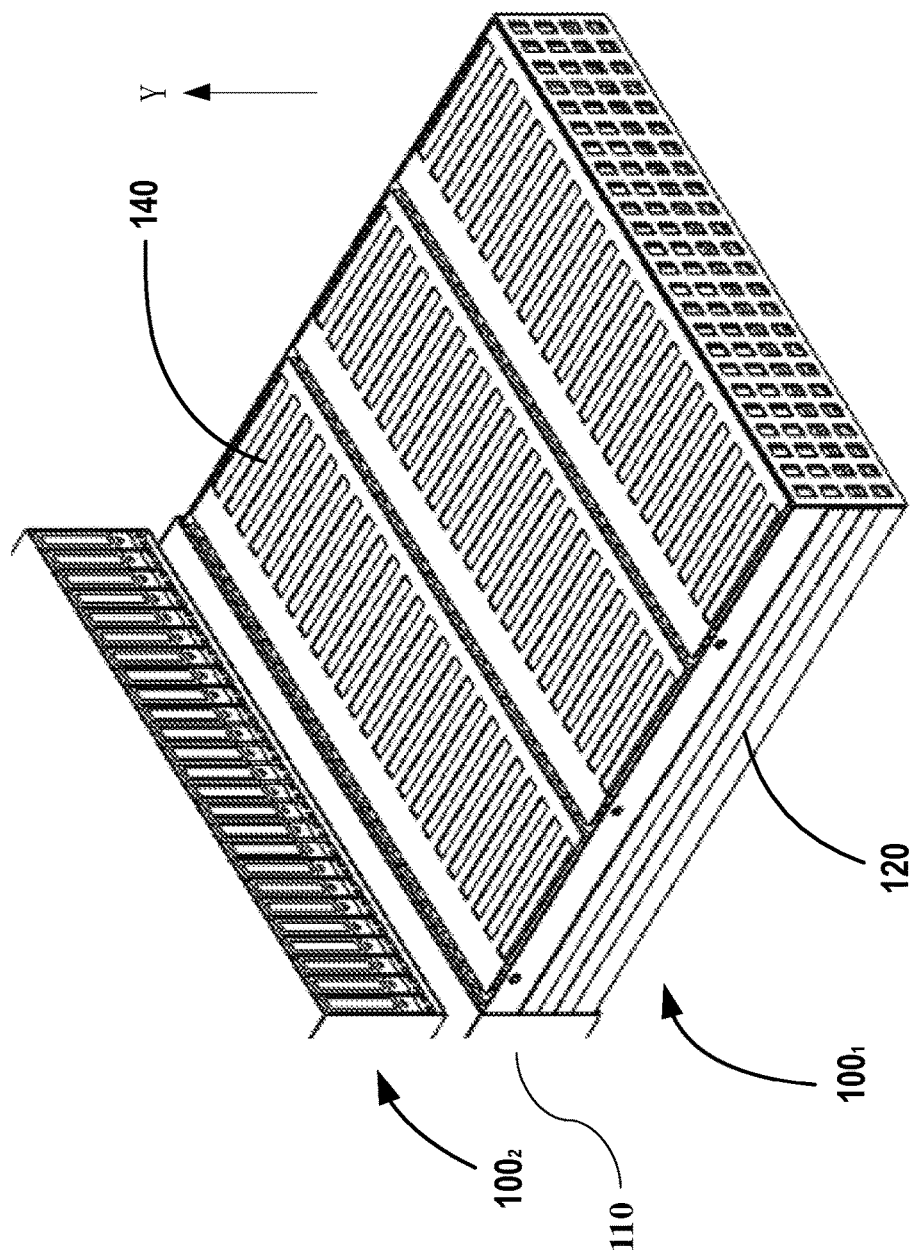
FIG. 4a illustrates a schematic structure diagram of a disk array enclosure having a cap according to one embodiment of the present invention.
Figure 4B:
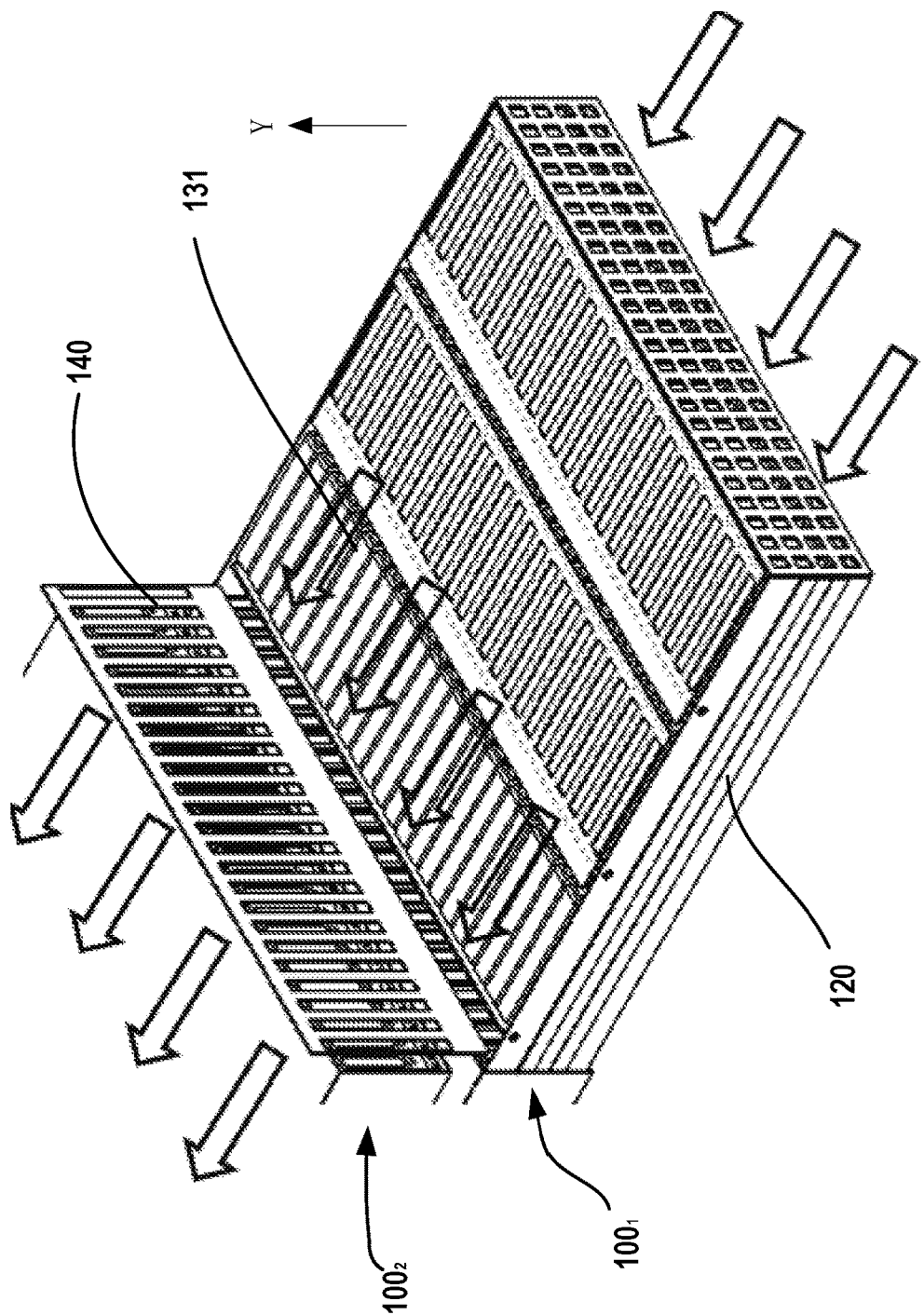
FIG. 4b illustrates a schematic airflow diagram of a disk array enclosure having a cap according to one embodiment of the present invention in a maintenance state.

FIGS. 3a, 3b, 4a and 4b illustrate various schematic diagrams associated with the cap in the disk array enclosure of the present application, wherein FIG. 3a shows a schematic diagram of a cap in a disk array enclosure according to one embodiment of the present invention; FIG. 3b shows a cross-section schematic diagram of a disk array enclosure having a cap according to one embodiment of the present invention; FIG. 4a shows a structure diagram of a disk array enclosure having an inner casing 120 and an outer casing or member 110 and a cap according to one embodiment of the present invention; and FIG. 4b shows an airflow schematic diagram of a disk array enclosure having a cap according to one embodiment of the present invention in a maintenance state.

As shown in FIGS. 3a and 3b, the cap 140 of the present application includes vents 142 and windshield bars 143. The vents 142 and the windshield bars 143 are arranged such that when the cap 140 is in a closed state, the vents 142 abut against an upper surface 133 of a corresponding disk device 131 and the windshield bars 143 cover the gaps 132 between adjacent disk devices. Such design of the vents 142 and the windshield bars 143 avoids the cooling airflow flowing inside the disk array enclosure $100_1$ from leaking via the above vents 142 and the gaps 132 between the adjacent disk devices when the cap 140 is closed, so as to ensure cooling effects inside the disk array enclosure $100_1$.

In some embodiments, the vents 142 and the windshield bars 143 extend in parallel with each other, and the windshield bars 143 and the vents 142 are staggered to form a grid structure. Positions of the windshield bar 143 and the vent 142 in the grid structure can respectively correspond to the upper surface of the disk device in the disk array enclosure and the gaps between the disk devices. Moreover, the number of vents 142 in each cap 140 can be identical to the number of disk devices 131 in each column of disk devices. In some embodiments, a width of a windshield bar 143 can be greater (e.g., slightly greater) than a width of a gap 132. Alternatively or additionally, in some embodiments, the opening area of a single vent 142 can be smaller (e.g., slightly smaller) than the area of the upper surface 133 of a single disk device 131. It will be understood that the cap 140 having the above grid structure in the staggered arrangement and the vent and the windshield bar designed according to the above dimension can maximize the opening area of the vent 142, so as to realize optimal thermal performance improvement. However, it should also be appreciated that without deviating from the principles of the present disclosure, other designs including other shapes and numbers of vents 142 and windshield bars 143 are also possible as long as the above functions of the vents 142 and the windshield bars 143 can be achieved. It is to be understood that in the case that the opening area of the vent 142 in each cap 140 is increased, the thermal performance of the disk device array enclosure in the maintenance state will be beneficially improved. The details will be further discussed below.

FIGS. 4a and 4b respectively illustrate schematic diagrams of a cap in closed and opening states. During maintenance of the disk device, the disk devices in e.g., the first disk array enclosure $100_1$ is firstly pulled out from the drawer (see FIG. 4a). Afterwards, a corresponding cap 140 in the disk array enclosure can be opened to take out the disk device 131 in need of maintenance (see FIG. 4b).

As shown in the airflow diagram of FIG. 4b, with the cap 140 according to embodiments of the present disclosure, the cooling airflow can basically pass through the vents 142 of the cap without any obstruction, and then enter the inside of the second disk array enclosure $100_2$. In other words, when the first disk array enclosure $100_1$ is in the maintenance state, the opening or closing state of the cap 140 of the first disk array enclosure $100_1$ will not influence normal flow of the cooling airflow of the second disk array enclosure $100_2$. Compared with the cap design in the traditional disk array enclosure (see FIG. 2b), the thermal performance of the second disk array enclosure $100_2$ can be greatly improved during the maintenance of the first disk array enclosure $100_1$, because the cooling airflow can normally flow into the second disk array enclosure $100_2$.

It can be seen from FIG. 4b that when the opening area in the cap 140 is larger, it is favorable for the airflow to enter the second disk array enclosure $100_2$. However, in order to guarantee the cooling effects in the first disk array enclosure $100_1$ when the cap 140 is closed, the windshield bars 143 covering the gaps 132 between adjacent disk devices are necessary. This is because the windshield bars 143 can prevent leakage of the normal cooling airflow in the first disk array enclosure $100_1$.

Although the present invention has been explained and described in details in the drawings and the above description, the explanations and descriptions should be regarded as illustrative or exemplary instead of restrictive; the present invention is not limited to the embodiments disclosed herein. While practicing the claimed invention, those skilled in the art can understand and perform other transformations of the embodiments disclosed herein by studying the drawings, the disclosure and the attached claims.

In the claims, the term "include" does not exclude other elements and the indefinite article "a" or "an" does not exclude plural forms. A single element or other unit can satisfy functions of a plurality of items stated in the claims. The mere fact that certain measures are recited in mutually different embodiments or dependent claims does not indicate that a combination of these measures cannot be used to advantage. Without deviating from the spirit and the scope of the present application, the protection scope of the present applicant covers any possible combinations of various features recited in various embodiments or dependent claims. Any reference signs in the claims should not be interpreted as restrictions on the present invention.

We claim:

1. A storage system, comprising:
   at least one storage device array enclosure, the at least one storage device array enclosure including:
      a casing;
      a plurality of storage devices at least partially disposed within the casing, the storage devices arranged in columns and defining gaps between adjacent storage devices, the storage devices configured for storing data;
      a cap mountable relative to the casing and movable between an open state to permit access to the storage devices and a closed state to cover the storage devices, the cap including vents and bars between adjacent vents, such that when the cap is in the closed state, the vents abut against upper surfaces of respective storage devices and the bars cover respective gaps between adjacent storage devices to prevent release of air from the gaps.

2. The storage system of claim 1, wherein the bars and the vents are arranged in parallel relation with each other.

3. The storage system of claim 1, wherein the bars and the vents are staggered, thereby forming a grid structure.

4. The storage system of claim 1, wherein a width of a single bar is greater than a width of a single gap between adjacent storage devices, such that the single bar is in contacting relation with upper surfaces of adjacent storage devices when in the closed state of the cap to close a respective gap defined between adjacent storage devices.

5. The storage system of claim 1, wherein an open area of a single vent is smaller than an area of the upper surface of a single storage device.

6. The storage system of claim 1, wherein a number of the vents in the cap is equal to a number of storage devices in each column of the storage devices.

7. The storage system of claim 1, wherein the at least one storage device array enclosure includes an outer member, the casing being disposed within the outer member and being movable with respect to the outer member to expose the cap and permit movement of the cap from the closed state to the open state.

8. The storage system of claim 7, wherein the cap is rotatably mounted to the casing.

9. The storage system of claim 7, wherein the at least one storage device array enclosure at least includes a first storage device array enclosure and a second storage device array enclosure disposed on top of the first storage device array enclosure in superposed relation, wherein, when the cap of the first storage device array enclosure is in the open state, air is capable of passing through the vents of the cap of the first storage device array enclosure and enter the second storage device array enclosure.

10. The storage system of claim 1, wherein the storage devices comprise disk devices.

11. A storage system, comprising:
    a first storage device array enclosure, including:
       a casing;
       a plurality of storage devices at least partially disposed within the casing and arranged in side by side relation, adjacent storage devices defining a gap therebetween, the storage devices configured for storing data; and
       a cap mounted to the casing and movable between an open state to permit access to the storage devices and a closed state to cover the storage devices, the cap defining an alternating series of bars and vents;
    wherein when in the closed state of the cap, the bars span respective gaps defined between adjacent storage devices to close the gaps.

12. The storage system of claim 11, wherein the cap is rotatably mounted to the casing and rotates between the open state and the closed state.

13. The storage system of claim 11, wherein the bars are each configured to contact respective adjacent storage devices to close respective gaps when in the closed state of the cap.

14. The storage system of claim 13, wherein the vents of the cap are aligned with respective storage devices when the cap is in the closed state.

15. The storage system of claim 11, including first and second rows of the storage devices, each of the first and second rows having the storage devices arranged in side by side relation.

16. The storage system of claim 15, including a first cap mounted to the casing and associated with the first row of the storage devices and a second cap mounted to the casing and associated with the second row of the storage devices, wherein the first and second caps are each respectively movable between the open and closed states relative to the first and second rows of the storage devices.

17. The storage system of claim 11, wherein the first storage device array enclosure includes an outer member, the casing being disposed within the outer member and being movable with respect to the outer member to expose the cap and permit movement of the cap from the closed state to the open state.

18. The storage system of claim 17, including a second storage device array enclosure disposed in superposed relation with respect to the first storage device array enclosure, wherein, when the cap of the first storage device array enclosure is in the open state, air is capable of passing through the vents of the cap and enter gaps defined between adjacent storage devices of the second storage device array enclosure.

19. A storage system, comprising:
a first storage device array enclosure, including:
- a casing;
- a plurality of storage devices at least partially disposed within the casing and arranged in side by side relation, adjacent storage devices defining a gap therebetween, the storage devices configured for storing data;
- a cap mounted to the casing and movable between an open state to permit access to the storage devices and a closed state to cover the storage devices, the cap defining an alternating series of bars and vents, wherein when in the closed state of the cap, the bars are aligned with respective gaps defined between adjacent storage devices to cover the gaps; and a second storage device array enclosure disposed in superposed relation relative to the first storage device array enclosure;
wherein the casing of the first storage device array enclosure is movable relative to the second storage device array enclosure to at least partially expose the plurality of storage devices and the cap, and permit the cap to move from the closed state to the open state; and
wherein, when in the open state of the cap, air is capable of passing through the vents of the cap and enter the second storage device array enclosure.

20. The storage system of claim 19, wherein the storage devices comprise disk devices.

\* \* \* \* \*